US009898691B2

(12) United States Patent
Takamoto

(10) Patent No.: US 9,898,691 B2
(45) Date of Patent: Feb. 20, 2018

(54) CONTROL DEVICE, CONTROL SYSTEM, AND CONTROL METHOD OF A CONTROL DEVICE

(71) Applicant: Seiko Epson Corporation, Tokyo (JP)

(72) Inventor: Akio Takamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/263,522

(22) Filed: Apr. 28, 2014

(65) Prior Publication Data

US 2015/0002889 A1 Jan. 1, 2015

(30) Foreign Application Priority Data

Apr. 26, 2013 (JP) ................................ 2013-093705
Apr. 26, 2013 (JP) ................................ 2013-093706

(51) Int. Cl.
*G06F 3/12* (2006.01)
*G06K 15/02* (2006.01)
*G07G 5/00* (2006.01)
*G06Q 20/20* (2012.01)

(52) U.S. Cl.
CPC ........ *G06K 15/1806* (2013.01); *G06F 3/1211* (2013.01); *G06F 3/1237* (2013.01); *G06F 3/1244* (2013.01); *G06F 3/1285* (2013.01); *G06F 3/1288* (2013.01); *G06Q 20/209* (2013.01); *G07G 5/00* (2013.01)

(58) Field of Classification Search
USPC ....................................................... 358/1.15
See application file for complete search history.

(56) References Cited

U.S. PATENT DOCUMENTS

| | | | |
|---|---|---|---|
| 2003/0184774 A1* | 10/2003 | Minowa .......................... | 358/1.9 |
| 2005/0271446 A1* | 12/2005 | Minowa ................... | B26D 5/30 400/621 |
| 2006/0232619 A1* | 10/2006 | Otsuka et al. ..................... | 347/5 |
| 2011/0141494 A1 | 6/2011 | Yu | |
| 2011/0282662 A1* | 11/2011 | Aonuma ................. | G10L 17/26 704/231 |
| 2012/0069404 A1* | 3/2012 | Kodama et al. ............. | 358/1.18 |
| 2012/0259719 A1* | 10/2012 | Bar-Levav et al. ............. | 705/21 |
| 2013/0054396 A1* | 2/2013 | Goldfinger ......... | G06Q 30/0238 705/21 |

(Continued)

FOREIGN PATENT DOCUMENTS

| | | |
|---|---|---|
| JP | 2004-058323 A | 2/2004 |
| JP | 2005-144994 A | 6/2005 |
| JP | 2005-343028 A | 12/2005 |

(Continued)

*Primary Examiner* — Huo Long Chen
(74) *Attorney, Agent, or Firm* — Nutter McClennen & Fish LLP; John J. Penny, Jr.; Santiago Velez

(57) ABSTRACT

Concentrating the processing load on a specific device can be suppressed when producing coupons by effectively using information printed on a receipt. A host computer 12 has a print control unit 20*a* that generates and outputs a control command to produce a receipt to a receipt printer 10; and a command interpreting unit 20*b* that interprets a receipt control command generated by the print control unit 20*a*, extracts specific information contained in the control command for each server, generates transmission data for each server based on the extracted information, and sends the transmission data to the respective servers.

13 Claims, 6 Drawing Sheets

(56) References Cited

U.S. PATENT DOCUMENTS

2013/0073363 A1* 3/2013 Boal .................. G06Q 30/06
                                                          705/14.23
2014/0307272 A1* 10/2014 Suzuki .................. G07G 5/00
                                                            358/1.6

FOREIGN PATENT DOCUMENTS

| JP | 2006-323445 A | | 11/2006 | |
|----|---------------|---|---------|---|
| JP | 2007018042 A | * | 1/2007 | |
| JP | 2009-129029 A | | 6/2009 | |
| JP | 2011253507 A | * | 12/2011 | |
| JP | 2012-027633 A | | 2/2012 | |
| JP | 2012-190114 A | | 10/2012 | |
| JP | 2012-198613 A | | 10/2012 | |
| JP | 2014206789 A | * | 10/2014 | ............... G07G 5/00 |

* cited by examiner

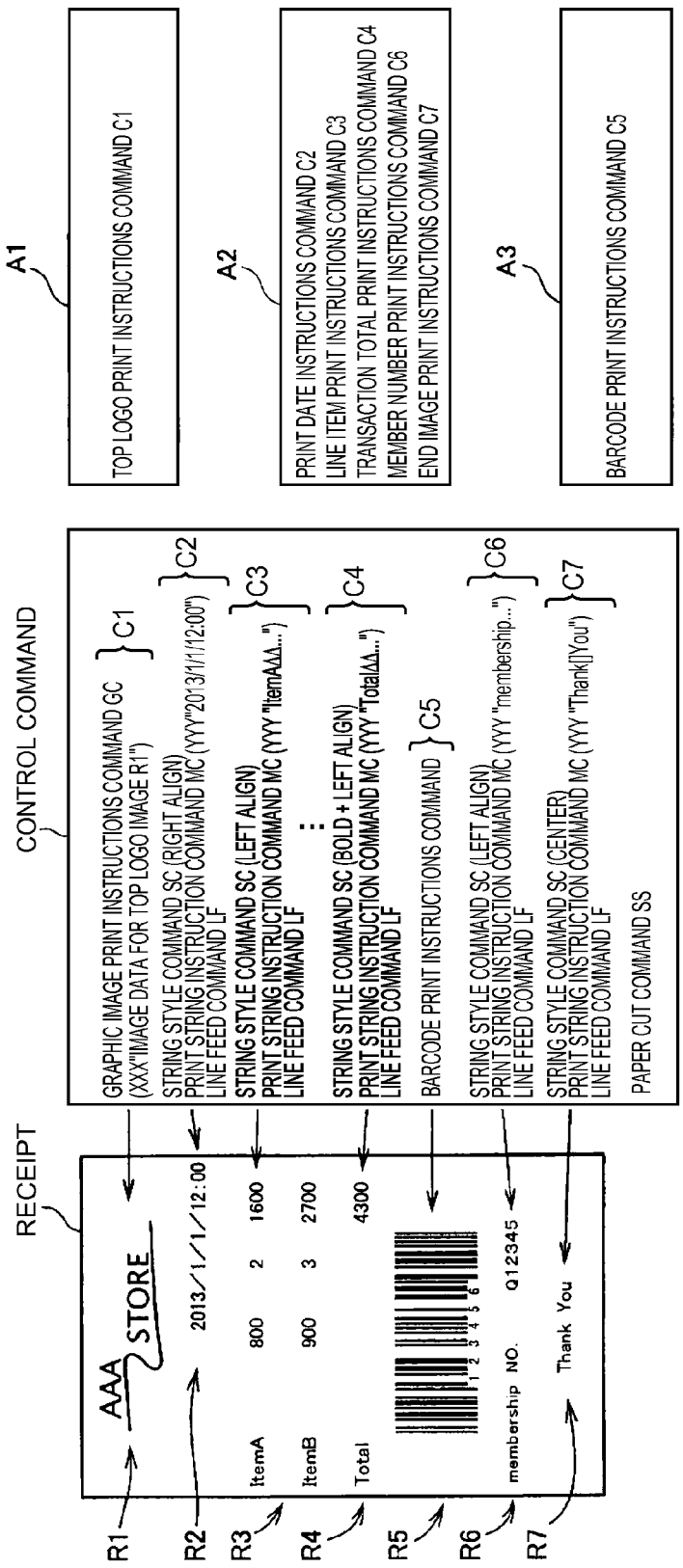

```
<product name>ItemA</product name>
<price>800</price>
<quantity>2</quantity>
<line total>1600</line total>
<product name>ItemB</product name>
<price>900</price>
<quantity>3</quantity>
<line total>2700</line total>
<transaction total>4300</transaction total>
<member number>Q12345</member number>
```

FIG. 5A

```
<receipt date>2013/11/1/12:00</receipt date>
<product name>ItemA</product name>
<price>800</price>
<quantity>2</quantity>
<line total>1600</line total>
<product name>ItemB</product name>
<price>900</price>
<quantity>3</quantity>
<line total>2700</line total>
<transaction total>4300</transaction total>
```

FIG. 5B

```
<receipt image data>image data of receipt</receipt image data>
<top logo image data>image data of top logo</top logo image data>
<receipt ID code>123456</receipt ID code>
```

FIG. 5C

```
<receipt date>2013/11/1/12:00</receipt date>
<product name>ItemA</product name>
<price>800</price>
<quantity>2</quantity>
<line total>1600</line total>
<product name>ItemB</product name>
<price>900</price>
<quantity>3</quantity>
<line total>2700</line total>
<transaction total>4300</transaction total>
<member number>Q12345</member number>
```

FIG. 5D

CONTROL DEVICE, CONTROL SYSTEM, AND CONTROL METHOD OF A CONTROL DEVICE

BACKGROUND

1. Technical Field

The present invention relates to a control device connected to a printer that produces receipts, to a control system including the control device and a server device, and a control method of the control device.

The present application claims priority based on and incorporates by reference the entire contents of Japanese Application No. 2013-093705 filed in Japan on Apr. 26, 2013, and Japanese Application No. 2013-093706 filed on Apr. 26, 2013.

2. Related Art

Systems that produce receipts and coupons are known from the literature. See, for example, JP-A-2009-129029. Such systems print information related to purchased products, information about the transaction, or information related to the customer, for example, on the receipt produced according to the customer transaction. Some systems produce a coupon based on the content of the transaction after producing a receipt, and relate the content of the coupon to the content of the receipt.

In systems such as the above that produce receipts, there is a need to effectively use information printed on the receipts for marketing and customer management. Systems that produce coupons as described above have a server computer that manages producing coupons, and are configured so that the printer used to produce coupons prints coupons as controlled by the this management server.

SUMMARY

The present invention solves at least part of the foregoing problem as described in the embodiments and examples of the invention below.

Example 1: A control device connecting to a printer that prints receipts and to a plurality of server devices includes a print control unit that generates and outputs a control command causing the printer to produce a receipt; and a command interpreting unit that interprets a receipt control command generated by the print control unit, extracts specific information contained in the control command for each server, generates transmission data for each server based on the extracted information, and sends the transmission data to the respective servers.

This configuration extracts information for individual servers from control commands for creating a receipt when producing a receipt, and sends transmission data based on the extracted information to each server. As a result, individual servers can acquire needed information from the information printed on a receipt, and information printed on a receipt can be effectively utilized by functions of each server.

Example 2: Preferably, a print string instruction command that specifies a string and instructs printing the specified string is included in the control command; and the command interpreting unit extracts the string, and generates and sends the transmission data containing the extracted string to a specific server when the content of the string specified by the print string instruction command matches specific content.

This configuration enables sending a string (information) of specific content to a specific server, and can send information needed by the server.

Example 3: Further preferably, the command interpreting unit identifies the content of a string based on the position of the string when the string is printed on the receipt recording medium based on the print string instruction command.

In this example, the receipt is characterized by the format of the printed image being known, and strings of specific content being printed at specific positions. This configuration can therefore use these characteristics to identify the content of strings printed on the receipt.

Example 4: Further preferably, a string style command that specifies applying a specific style to the string instructed to be printed by the print string instruction command is also contained in the receipt control command; and the command interpreting unit determines the content of the string based on the style applied to the string specified for printing by the print string instruction command.

In this configuration, the receipt is characterized by a specific style being regularly applied to a string containing specific content. This embodiment can therefore use this characteristic to determine the content of a string printed on a receipt.

Example 5: In another aspect of the invention, the command interpreting unit extracts specific information contained in the a receipt control command, and sends transmission data based on the extracted information to the server; and a coupon production control unit generates and outputs a control command to produce a coupon to the printer when command data instructing producing a coupon is received from the server after transmission of the transmission data.

In this configuration, the control device controls the printer to produce a coupon based on command data from the server instead of the server controlling the printer and causing the printer to produce a coupon. As a result, the server will not cause plural printers to produce coupons at the same time, for example, and concentrating the processing load on the server is prevented. Furthermore, because the command data received from the server is generated based on data extracted from the receipt control commands, coupons can be issued appropriately based on the content of the receipt.

Example 6: Further preferably, the control device is also connected to a coupon printer that produces coupons; and the coupon production control unit generates and outputs a control command to produce a coupon to the coupon printer when the command data is received from the server.

This configuration enables producing coupons from a printer for printing coupons without affecting printing receipts by the receipt printer.

Example 7: Further preferably, image data for an image that is printed on a coupon is relationally stored with identification information; identification information related to the image data of the coupon to be produced is included in the command data; and when the command data is received from the server, the coupon production control unit generates and outputs a coupon control command based on the image data related to the identification information contained in the command data.

This configuration enables reducing the amount of command data sent from the server to the control device, suppresses an increase in communication traffic, and improves communication efficiency.

Example 8: Further preferably, the command interpreting unit extracts at least one of information related to a purchased product and information related to a transaction from the receipt control command, and sends the transmission data based on the extracted information to the server.

With this configuration, the server can generate command data appropriately to the purchased products or the transaction based on information related to the purchased products or information related to the transaction.

Example 9: Another aspect of the invention is a control system including a control device connected to a printer that produces receipts, and a plurality of servers connected to the control device, wherein: the control device has a print control unit that generates and outputs a control command causing the printer to produce a receipt; and a command interpreting unit that interprets a receipt control command generated by the print control unit, extracts specific information contained in the control command for each server, generates transmission data for each server based on the extracted information, and sends the transmission data to the respective servers.

This configuration extracts information from the receipt control command for individual servers, and transmits transmission data based on the information extracted for each server, when a receipt is produced. As a result, each server can acquire necessary information from the information printed on the receipt, and information printed on the receipt can be effectively used by functions of the individual servers.

Example 10: Further preferably in this control system, the command interpreting unit extracts specific information contained in the a receipt control command, and sends transmission data based on the extracted information to the server; the server determines whether or not to produce a coupon based on the received transmission data, and if a coupon is to be produced, generates and sends to the control device command data instructing producing a coupon; and the control device has a coupon production control unit that generates and outputs a control command to produce a coupon to the printer when the command data is received from the server.

In this configuration, the control device controls the printer to produce a coupon based on command data from the server instead of the server controlling the printer and causing the printer to produce a coupon. As a result, the server will not cause plural printers to produce coupons at the same time, for example, and concentrating the processing load on the server is prevented. Furthermore, because the command data received from the server is generated based on data extracted from the receipt control commands, coupons can be issued appropriately based on the content of the receipt.

Example 11: Further preferably in this control system, the command interpreting unit of the control device extracts at least one of information related to a purchased product and information related to a transaction from the receipt control command, and sends the transmission data based on the extracted information to the server; and the server determines whether or not to produce a coupon based on the received transmission data.

With this configuration, the server can generate command data appropriately to the purchased products or the transaction based on information related to the purchased products or information related to the transaction.

Example 12: Another aspect of the invention is a control method of a control device connecting to a printer that prints receipts and to a plurality of server devices, including: generating and outputting a control command causing the printer to produce a receipt; interpreting the generated receipt control command and extracting specific information contained in the control command for each server; generating transmission data for each server based on the extracted information; and sending the transmission data to the respective servers.

This configuration extracts information for individual servers from control commands for creating a receipt when producing a receipt, and sends transmission data based on the extracted information to each server. As a result, individual servers can acquire necessary information from the information printed on a receipt, and information printed on a receipt can be effectively utilized by functions of each server.

Example 13: Preferably, the control method of a control device also includes extracting specific information contained in the generated receipt control command, and sending transmission data based on the extracted information to the server; and generating and outputting a control command to produce a coupon to the printer when command data instructing producing a coupon is received from the server after transmission of the transmission data.

With this control method, the control device controls the printer to produce a coupon based on command data from the server instead of the server controlling the printer and causing the printer to produce a coupon. As a result, the server will not cause plural printers to produce coupons at the same time, for example, and concentrating the processing load on the server is prevented. Furthermore, because the command data received from the server is generated based on data extracted from the receipt control commands, coupons can be issued appropriately based on the content of the receipt.

Example 14: Another aspect of the invention is a storage medium storing a program executed by a control unit that controls a control device connected to a printer that prints receipts and to a plurality of server devices, the program causing the control unit to: generate and output a control command causing the printer to produce a receipt; interpret the generated receipt control command and extract specific information contained in the control command for each server; generate transmission data for each server based on the extracted information; and send the transmission data to the respective servers.

With this program, information for individual servers is extracted from control commands for creating a receipt when producing a receipt, and transmission data based on the extracted information is sent to each server. As a result, individual servers can acquire necessary information from the information printed on a receipt, and information printed on a receipt can be effectively utilized by functions of each server.

Example 15: Another aspect of the invention is a storage medium storing a program executed by a control unit that controls a control device connected to a printer that prints receipts, the program causing the control unit to: generate and output a control command causing the printer to produce a receipt; interpret the generated receipt control command, extract specific information contained in the receipt control command, and send transmission data based on the extracted information to the server; and generate and output a control command to produce a coupon to the printer when command data instructing producing a coupon is received from the server after transmission of the transmission data.

With this program, the control device controls the printer to produce a coupon based on command data from the server instead of the server controlling the printer and causing the printer to produce a coupon. As a result, the server will not cause plural printers to produce coupons at the same time, for example, and concentrating the processing load on the server is prevented. Furthermore, because the command data received from the server is generated based on data extracted from the receipt control commands, coupons can be issued appropriately based on the content of the receipt.

Effect of the Invention

The invention enables effectively using information printed on a receipt, and prevents concentrating the processing load on a specific device when producing coupons.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 4A-4C describe the function of the command organizing unit.
FIGS. 5A-5D show examples of transmission data sent to the servers.

DESCRIPTION OF EMBODIMENTS

A preferred embodiment of the present invention is described below with reference to the accompanying figures.

Figure 1:
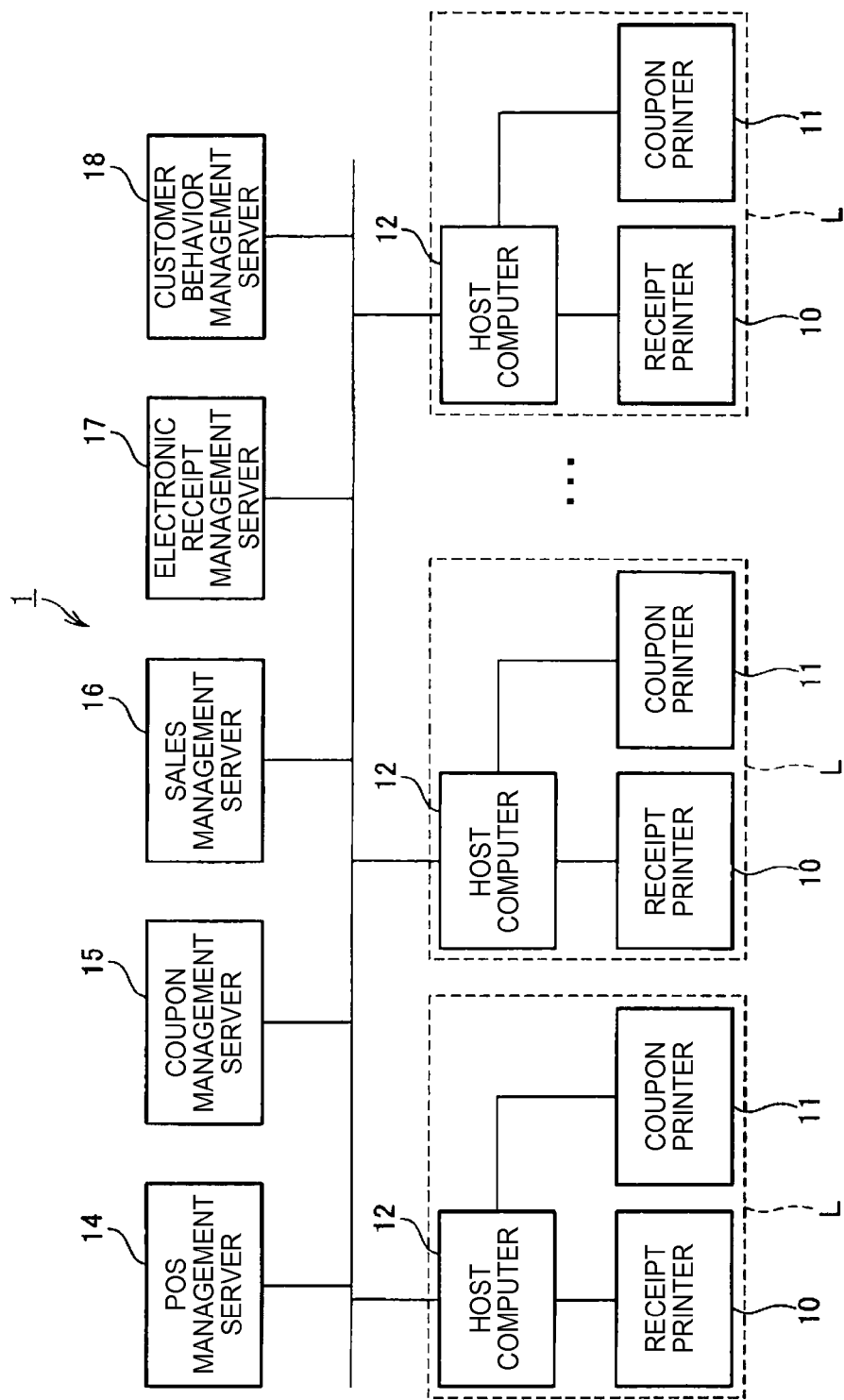
FIG. 1 illustrates the configuration of a control system.

FIG. 1 shows the configuration of a control system 1 according to a preferred embodiment of the invention.

This control system 1 is a POS system such as used in supermarkets and convenience stores to manage product marketing, sales, and inventory, for example, in a store. The control system 1 has a function for producing receipts according to customer transactions in the store, and a function for producing an appropriate coupon based on production of a receipt.

A store in which the control system 1 is deployed has plural checkout counters L. A receipt printer 10 (printing device), which is a printer for producing receipts, a coupon printer 11 (a printer for producing coupons), and a host computer 12 (control device) that controls the printers are installed at each checkout counter L.

The receipt printer 10 is a thermal printer, for example, and as controlled by the corresponding host computer 12, applies heat by the thermal head to the printing surface of thermal roll paper to print images, and then cuts the thermal roll paper at a specific position to issue a receipt.

The coupon printer 11 is, for example, an inkjet printer, and as controlled by the corresponding host computer 12, ejects ink by an inkjet head onto the surface of roll paper to print images, and then cuts the roll paper at a specific position to issue a coupon.

A POS management server 14 is connected through a LAN or other network N to each host computer 12. The POS management server 14 stores databases such as a product master, customer master, and inventory master, and centrally manages the control system 1. The host computer 12 accesses the POS management server 14 as appropriate when producing a receipt to acquire the necessary information.

As shown in FIG. 1, a coupon management server 15 (server computer), sales management server 16 (server computer), electronic receipt management server 17 (server computer), and customer behavior management server 18 (server computer) are connected to the network N. These servers are further described below.

Figure 2:
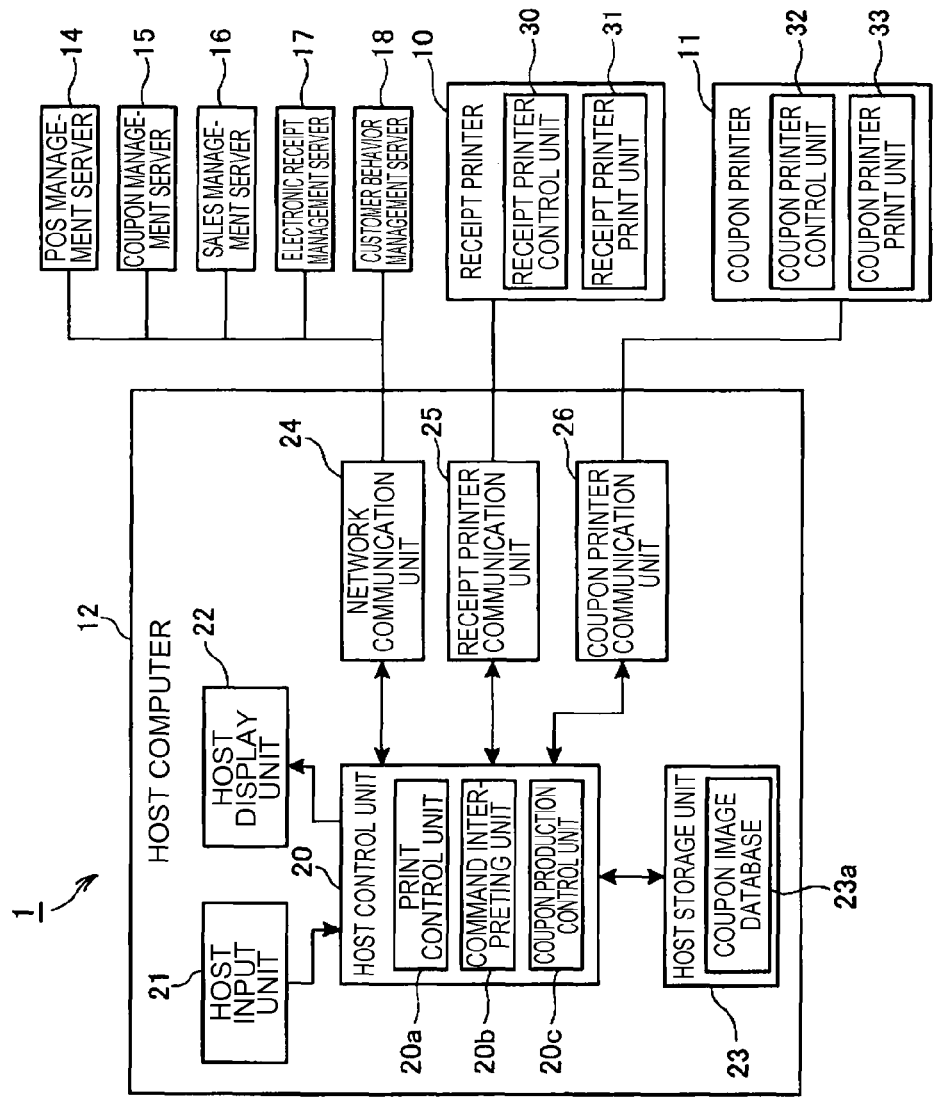
FIG. 2 is a block diagram showing the functional configuration of devices in the control system.

FIG. 2 is a basic block diagram showing the functional configuration of devices in the control system 1, particularly the host computer 12, receipt printer 10, coupon printer 11, and coupon management server 15.

As shown in FIG. 2, the host computer 12 includes a host control unit 20 (control unit), a host input unit 21, a host display unit 22, a host storage unit 23, a network communication unit 24, a receipt printer communication unit 25, and a coupon printer communication unit 26.

The host control unit 20 includes a CPU, ROM, RAM, and other peripheral circuits, and controls other parts of the host computer 12. Function blocks of the host control unit 20 include a print control unit 20a, a command interpreting unit 20b, and a coupon production control unit 20c, which are further described below.

The host input unit 21 is connected to input devices such as a mouse and keyboard, detects input through these input devices, and outputs to the host control unit 20. The host display unit 22 is connected to an LCD panel or other display panel, and as controlled by the host control unit 20, displays data on the display panel. The host storage unit 23 has memory such as a hard disk drive or EEPROM device, and can nonvolatilely store data rewritably. A coupon image database 23a is stored in the host storage unit 23 as further described below. The network communication unit 24 communicates over the network N with external devices on the network N as controlled by the host control unit 20 according to a specific communication protocol. The receipt printer communication unit 25 communicates with the receipt printer 10 as controlled by the host control unit 20 according to a specific communication protocol. The coupon printer communication unit 26 communicates with the coupon printer 11 as controlled by the host control unit 20 according to a specific communication protocol.

As also shown in FIG. 2, the receipt printer 10 has a receipt printer control unit 30 and a receipt printer print unit 31. The receipt printer control unit 30 has a CPU, and controls other parts of the receipt printer 10. The receipt printer print unit 31 has a printhead that prints images on a recording medium, a conveyance mechanism that conveys the recording medium, and a cutting mechanism that cuts the recording medium. The coupon printer 11 has a similar coupon printer control unit 32 and coupon printer print unit 33.

Figure 3:
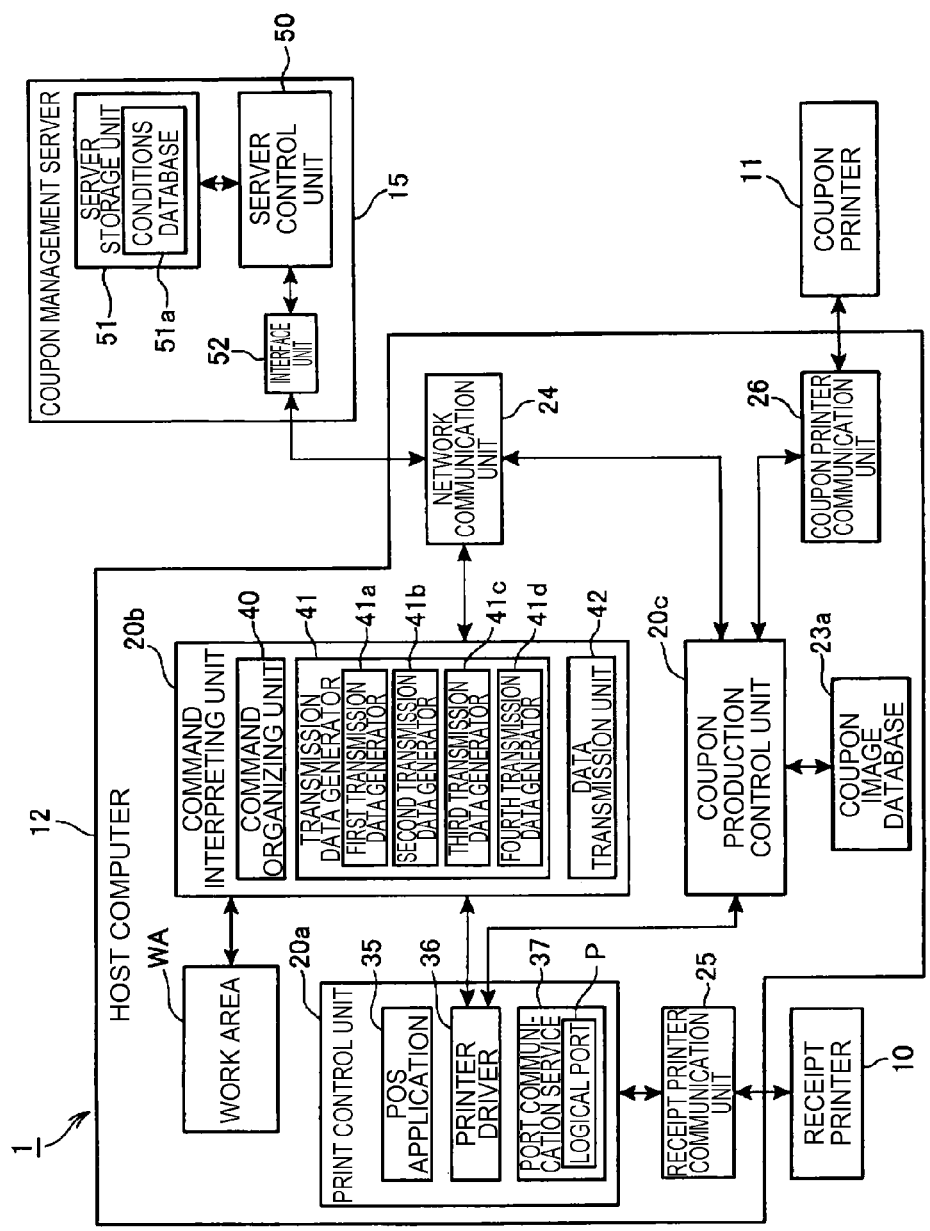
FIG. 3 describes the function blocks of the host computer in detail.

FIG. 3 illustrates the functional configuration of the host computer 12 in further detail. For convenience of description, the function blocks of the coupon management server 15 are also shown in FIG. 3.

For convenience of description, function blocks, programs, storage areas, and physical devices are all represented by equivalent blocks in FIG. 3.

Note that the functions of the function blocks described below are achieved by the cooperation of hardware and software, such as by a CPU reading and running a program.

The print control unit 20a of the host control unit 20 is a function block with the ability to generate and output a control command causing the receipt printer 10 to produce a receipt.

More specifically, a POS application 35 and printer driver 36 are installed on the host computer 12. Using a function of the POS application 35, the print control unit 20a generates print data containing information related to images to be printed on the receipt, and outputs to the printer driver 36. Using a function of the printer driver 36, the print control unit 20a generates a control command that causes the receipt printer 10 to execute processes related to producing a receipt based on the print data, and outputs to a logical port P, which is opened as a software (logical) port.

Using a function of the port communication service (PCS) 37, the print control unit 20a applies a specific process to the control command output from the logical port P, and outputs to the receipt printer communication unit 25.

The port communication service 37 is a function that can be called from the printer driver 36, and has the ability to input and output data between the print control unit 20a and the receipt printer communication unit 25.

The port communication service 37 applies data shaping and data conversion according to the standard (RS232C, USB, or other) of the interface between the host computer 12 and receipt printer 10 based on the data (including control commands) output by the printer driver 36 and data input to the printer driver 36. Differences between different interface standards can thereby be absorbed, and communication through interfaces using different standards is possible without applying software modifications to the printer driver 36. The receipt printer communication unit 25 sends input control commands based on a specific communication protocol to the receipt printer 10. The receipt printer 10 then produces a receipt based on the received control commands.

The command interpreting unit 20b is a function block that interprets control commands generated by a function of the printer driver 36 and causing the receipt printer 10 to produce a receipt, and executes processes such as described below.

The function of the command interpreting unit 20b is rendered by a program created using API functions provided by OPOS or UPOS. This command interpreting unit 20b program can be called as needed by a printer driver 36 conforming to the same OPOS or UPOS standard.

As shown in FIG. 3, function blocks of the command interpreting unit 20b include the command organizing unit 40, transmission data generator 41, and data transmission unit 42. The capabilities of these function blocks are achieved by the cooperation of hardware and software, such as a CPU reading and running a program.

The command organizing unit 40 is described next.

FIGS. 4A-4C describe the command organizing unit 40. FIG. 4A shows an example of a receipt produced by the receipt printer 10, FIG. 4B shows the content of control commands generated to produce the receipt shown in FIG. 4A, and FIG. 4C illustrates organizing the control commands shown in FIG. 4B by a function of the command organizing unit 40 in a format that facilitates description.

As shown in FIG. 4A, a top logo image R1 showing an example of a so-called top logo is printed at the top of the receipt. A receipt date image R2 showing the date (date and time) that the receipt was produced is printed below the top logo image R1. The text string (a string showing the date and time) presented by the receipt date image R2 is printed right-aligned.

A purchased product image R3 is printed below the receipt date image R2. The purchased product image R3 is an image of a list showing the name, price, quantity, and line item total (an amount calculated by multiplying the product price by the quantity) for each product purchased by the customer. More specifically, the name, price, quantity, and line item total are printed for each product purchased by the customer on one line in the purchased product image R3 according to the following rule. More specifically, the product name is printed starting from the first character on the line. Next, the product price is printed from character T1 (where T1 is a predetermined positive integer). Next, the quantity purchased is printed from character T2 (where T2 is a predetermined positive integer, and T2>T1). Next, the line item total for that product is printed from character T3 (where T3 is a predetermined positive integer, and T3>T2). The strings on each line in the purchased product image R3 are printed left-aligned.

A total amount image R4 showing the total amount of the purchased products is printed below the purchased product image R3. The string in the total amount image R4 is printed left-aligned and bold. A barcode image R5 of a barcode representing a receipt identification number is printed below the total amount image R4. A member number image R6 showing the member number of the customer is printed below the barcode image R5. The string in the member number image R6 is printed left-aligned. While not shown in the figures, a card reader that reads a member card belonging to the customer is connected to the host computer 12. When the customer presents a member card during a transaction at the checkout counter L, the member card is read by the card reader. The member number recorded on the member card is stored in a specific storage area of the host computer 12.

An end image R7 showing a default string recorded at the end of each receipt is printed below the member number image R6. In the example in FIG. 4A, the string in the member number image R6 says "Thank[ ]You" (where the square brackets [ ] represent a space, here and below). The string in the member number image R6 is printed centered.

The receipt layout in this embodiment of the invention basically conforms to the layout of the receipt shown in FIG. 4A. More specifically, a top logo image R1, a receipt date image R2, a purchased product image R3, a total amount image R4, a barcode image R5, a member number image R6, and an end image R7 are printed sequentially from top to bottom on a receipt in this embodiment of the invention.

Note that a simple receipt layout is described here for convenience of description, and images related to other information, such as tax information and the change due, are normally also printed.

As shown in FIG. 4B, a control command related to a receipt is composed of plural individual commands.

As shown in FIG. 4B, the control command for printing a receipt includes a top logo print instructions command C1. This top logo print instructions command C1 is a command that instructs printing the top logo image R1, and includes a graphic image print instructions command GC. A graphic image print instructions command GC includes a command code instructing printing a graphic image, and print data for the image to be printed. The image data is, for example, data that stores information such as a gray scale level for each pixel in bitmap data. In this embodiment, the graphic image print instructions command GC is in the format (XXX "image data") (where XXX is a command code instructing printing an image based on the image data). The graphic image print instructions command GC in the top logo print instructions command C1 is in the format (XXX "image data for top logo image R1").

Next after the top logo print instructions command C1 in the receipt control command is a print date instructions command C2. The print date instructions command C2 is a command instructing printing the receipt date image R2, and includes a string style command SC, a print string instruction command MC, and a line feed command LF.

The string style command SC is a command specifying the style to be applied when printing the string specified by the print string instruction command MC. A style means applying some process related to drawing the printed string. Styles include, for example, moving the position of the string (left-aligned, centered, right-aligned, for example), or enlarging, reducing, rotating, emphasizing, bolding, or adding a styled character or style symbol to the string. The string style command SC in the print date instructions command C2 in this example instructs applying right-aligned styling to the printed string.

The print string instruction command MC is a command specifying a specific string and instructing printing the specified string. The print string instruction command MC includes a command code instructing printing a string, and a data packet specifying the string. A combination of characters expressed by a specific character code (such as Unicode or ASCII) is written in the data packet. The print string instruction command MC in the print date instructions command C2 in this example is in the format (YYY"2013/1/1/12:00") (where YYY is the command code instructing printing a string, and the content between double quotation marks is the data packet specifying the string to be printed). Note that in this embodiment font data for each character is previously registered in the receipt printer 10 for each of the characters that can be recorded by the receipt printer 10. The receipt printer 10 converts each character in the string to be printed to the font data based on the print string instruction command MC, and prints based on the converted font data.

The line feed command LF is a command instructing a line feed.

A line item print instructions command C3 is written next after the print date instructions command C2 in the receipt control command. A line item print instructions command C3 is added for each purchased product (=each line) in the purchased product image R3.

The line item print instructions command C3 includes a string style command SC instructing applying a left-aligned style; a print string instruction command MC specifying a string expressing the product name, price, quantity, and line item total, and instructing printing the string; and a line feed command LF. More specifically, an appropriate number of spaces is inserted in the data packet of the print string instruction command MC between the string denoting the product name and the string denoting the product price so that the string denoting the product price is printed from character T1. An appropriate number of spaces is similarly inserted in the data packet between the string denoting the product price and the string denoting the product quantity so that the string denoting the product quantity is printed from character T2. An appropriate number of spaces is similarly inserted in the data packet between the string denoting the product quantity and the string denoting the line item total so that the string denoting the line item total is printed from character T3. An example of the data packet is ("ItemA [ ][ ][ ][ ][ ]800[ ][ ][ ]2[ ][ ][ ][ ]1600").

A transaction total print instructions command C4 is included next after the line item print instructions commands C3 in the receipt control command. This transaction total print instructions command C4 includes a string style command SC instructing applying bold and left-align styles; a print string instruction command MC specifying the string "Total" and a string denoting the receipt total, and instructing printing the strings; and a line feed command LF.

Next after the transaction total print instructions command C4 in the receipt control command is a barcode print instructions command C5. This barcode print instructions command C5 is a command specifying the code, and instructing printing a barcode image R5 representing the specified code. The receipt printer 10 also has a function for generating image data for the barcode based on the code specified by the barcode print instructions command C5, and printing a barcode image R5 based on the generated image data.

Next after the barcode print instructions command C5 in the receipt control command is a member number print instructions command C6. This member number print instructions command C6 includes a string style command SC instructing applying the left-align style; a print string instruction command MC specifying the string "membership[ ]NO." and a string denoting the member number, and instructing printing the strings; and a line feed command LF.

Next after the member number print instructions command C6 in the receipt control command is an end image print instructions command C7. The end image print instructions command C7 includes a string style command SC instructing applying the center style; a print string instruction command MC specifying the string "Thank[ ]You" and instructing printing the string; and a line feed command LF.

Following the end image print instructions command C7 in the receipt control command is a paper cut command SS. This paper cut command SS is a command instructing cutting the roll paper. The paper cut command SS is always the last command in the control command instructing producing a receipt.

The control commands generated by a function of the printer driver 36 are sequentially stored to a specific memory area in a work area WA created in RAM. The command organizing unit 40 monitors if the paper cut command SS is stored in the work area WA while storing the control commands in the work area WA, and executes the following process triggered by the paper cut command SS being stored. That the paper cut command SS was stored in the work area WA means that all commands included in the receipt control command were stored in the work area WA.

More specifically, the command organizing unit 40 interprets the control command, and groups the commands in the control command into commands related to printing strings, commands related to printing graphic images, and commands related to printing a barcode. The command organizing unit 40 then stores the grouped commands in separate spaces in the work area WA as shown in FIG. 4C. In FIG. 4C, memory area A1 is the area where commands for printing graphic images are stored, and the top logo print instructions command C1 is stored therein. Memory area A2 is the area where commands for printing strings are stored, and the print date instructions command C2, all line items print instructions commands C3, the transaction total print instructions command C4, the member number print instructions command C6, and the end image print instructions command C7 are stored therein. These commands are stored in memory area A2 in the same order as the order in the control command. Memory area A3 is the area where commands related to barcode printing are stored, and the barcode print instructions command C5 is stored therein.

The command organizing unit 40 thus detects when all control commands have been stored in the work area WA, and groups and stores the individual commands contained in the control commands by type in separate memory areas.

The transmission data generator 41 is described next.

The transmission data generator 41 includes a first transmission data generator 41a, second transmission data generator 41b, third transmission data generator 41c, and fourth transmission data generator 41d.

The first transmission data generator 41a is a function block that generates first transmission data D1 sent to the coupon management server 15. The first transmission data generator 41a is described below.

FIG. 5A illustrates the first transmission data D1 in a form suitable for description. In this embodiment the first transmission data D1 is data written in XML or other markup language. Information denoting the product name, price, quantity, and line item total (purchased product information) for each purchased product is included in the first transmission data D1. Information related to the transaction total (transaction-related information) and information denoting the member number is also included in the first transmission data D1.

The first transmission data generator 41a generates the first transmission data D1 as described below. A product name, price, quantity, and line item total are printed on each line in the purchased product image R3, but the line items print instructions commands C3 instructing printing each line have the following features. First, the line item print instructions command C3 instructing printing the first line is recorded next after the print date instructions command C2. Second, the line item print instructions command C3 instructing printing the last line is inserted before the transaction total print instructions command C4. Third, the string style command SC in a line item print instructions command C3 instructs applying the left-align style. The first transmission data generator 41a uses these features to extract all line item print instructions commands C3 from the commands stored in memory area A2.

More specifically, the first transmission data generator 41a first identifies the print date instructions command C2 in the commands stored in memory area A2. For example, the first transmission data generator 41a can identify the print date instructions command C2 using the knowledge that the print date instructions command C2 is the first command stored in memory area A2. Alternatively, the first transmission data generator 41a can identify the print date instructions command C2 by identifying the string style command SC in the print date instructions command C2 by knowing that the string style command SC in the print date instructions command C2 is a command specifying applying the left-align style, for example. Further alternatively, the first transmission data generator 41a can identify the print date instructions command C2 by identifying the print string instruction command MC in the print date instructions command C2 by a string search based on knowing that the string specified by the print string instruction command MC in the print date instructions command C2 contains **** (where * denotes a wildcard), for example.

Next, the first transmission data generator 41a finds the transaction total print instructions command C4 in the commands stored in memory area A2. For example, the first transmission data generator 41a can find the transaction total print instructions command C4 by finding the string style command SC in the transaction total print instructions command C4 based on knowing that the string style command SC in the transaction total print instructions command C4 specifies applying bold and left-align styles. Alternatively, the first transmission data generator 41a can find the transaction total print instructions command C4 by finding the print string instruction command MC in the transaction total print instructions command C4 by a string search based on knowing that the print string instruction command MC in the transaction total print instructions command C4 contains the string "Total".

After finding the print date instructions command C2 and the transaction total print instructions command C4 in memory area A2 as described above, the first transmission data generator 41a finds and extracts all line item print instructions commands C3 stored between those commands. In this event, the first transmission data generator 41a could more accurately extract the line item print instructions commands C3 based on knowing that the string style command SC in the line item print instructions command C3 specifies applying the left-align style.

Next, the first transmission data generator 41a gets the information indicating the product name, price, quantity, and line item total of each product based on each of the line item print instructions commands C3.

The product name, price, quantity, and line item total can be extracted from one line item print instructions command C3 as follows. As described above, the product name is printed starting from the first character, the product price is printed from character T1, the quantity purchased is printed from character T2, and the line item total is printed from character T3 in the data packet of the print string instruction command MC in the line item print instructions command C3. Based thereon, the first transmission data generator 41a extracts the continuous string written from the first character in the data packet as the product name. The first transmission data generator 41a likewise extracts the continuous string written from character T1 in the data packet as the price. The first transmission data generator 41a likewise extracts the continuous string written from character T2 in the data packet as the product quantity. The first transmission data generator 41a likewise extracts the continuous string written from character T3 in the data packet as the line item total.

The first transmission data generator 41a also extracts the transaction total print instructions command C4 from the command stored in memory area A2 using the above method, and acquires the transaction total based on the extracted command. The transaction total is written in numbers following a space after the Total string in the data packet of the print string instruction command MC in the transaction total print instructions command C4. Based thereon, the first transmission data generator 41a acquires the numeric string written following a space after the Total string in the data packet of the print string instruction command MC in the transaction total print instructions command C4 as the transaction total.

The first transmission data generator 41a also identifies the member number print instructions command C6 in the commands stored in memory area A2, and acquires the member number based on the extracted command. The member number print instructions command C6 is stored before the end image print instructions command C7 in the memory area A2. Based thereon, the first transmission data generator 41a identifies the end image print instructions command C7, and then identifies the member number print instructions command C6 as the command stored before the end image print instructions command C7. Note that the end image print instructions command C7 can be identified based on it being the last command in the commands stored in the memory area A2, or based on knowing that the associated print string instruction command MC specifies printing the string "Thank[ ]You".

The first transmission data generator 41a can also identify the member number print instructions command C6 by identifying the print string instruction command MC in the member number print instructions command C6 by a string search based on knowing that the string "membership[ ]NO." the print string instruction command MC in the member number print instructions command C6 instructs printing is contained in the command.

After finding the member number print instructions command C6, the first transmission data generator 41*a* extracts the member number as follows. More specifically, a string denoting the member number is written following a space after the "membership[ ]NO." string in the data packet of the print string instruction command MC in the member number print instructions command C6. Based thereon, the first transmission data generator 41*a* acquires the string following the space after the "membership[ ]NO." string in the data packet of the print string instruction command MC in the member number print instructions command C6 as the member number.

After acquiring the information indicating the product name, price, quantity, and line item total for each purchased product, and acquiring the transaction total and member number, the first transmission data generator 41*a* generates the first transmission data D1 (FIG. 5A) based on the acquired information. As described above, the first transmission data D1 in this embodiment is data written in markup language. For example, the first transmission data D1 is generated by storing the data in variables defined in a specific program and then running the program. Further alternatively, the first transmission data D1 could be generated by using a predefined style sheet defining the format of the first transmission data D1, and writing the appropriate information to the appropriate places in the style sheet.

As described above, the first transmission data D1 is data sent to the coupon management server 15. The operation of the coupon management server 15 and the host computer 12 after the first transmission data D1 is sent to the coupon management server 15 is described below.

The second transmission data generator 41*b* is described next.

The second transmission data generator 41*b* is a function block that generates the second transmission data D2 sent to the sales management server 16.

FIG. 5B illustrates the second transmission data D2 in a format suited to description. The second transmission data D2 is data written in XML or other markup language.

As shown in FIG. 5B, information denoting the date and time the receipt was issued, information identifying the product name, price, quantity, and line item total of each product, and information denoting the transaction total are contained in the second transmission data D2.

The second transmission data generator 41*b* extracts the information identifying the product name, price, quantity, and line item total of each product, and the information denoting the transaction total, by the method described above. The second transmission data generator 41*b* also gets the information denoting the date and time the receipt was produced by identifying the print date instructions command C2 in the memory area A2, and extracting the string denoting the date and time from the data packet of the command, by the method described above. Based on the acquired information denoting the date and time the receipt was issued, information identifying the product name, price, quantity, and line item total of each product, and information denoting the transaction total, the second transmission data generator 41*b* then generates the second transmission data D2.

The third transmission data generator 41*c* is described next.

The third transmission data generator 41*c* is a function block that generates the third transmission data D3 sent to the electronic receipt management server 17. The third transmission data generator 41*c* is described below in detail.

FIG. 5C illustrates the third transmission data D3 in a format suited to description. The third transmission data D3 is data written in XML or other markup language.

As shown in FIG. 5C, receipt image data, image data for the top logo printed on the receipt, and an identification code for the receipt, are included in the third transmission data D3. The receipt identification code is the code expressed in the barcode that is printed on the receipt.

The third transmission data generator 41*c* generates image data (referred to below as receipt image data) for images printed on a receipt (the image shown in FIG. 4A), for example) based on a control command stored at a specific address in the work area WA. A function for generating receipt image data based on a control command is embedded in the program rendering the function of the third transmission data generator 41*c*. The third transmission data generator 41*c* also acquires the top logo print instructions command C1 stored in memory area A1, and extracts the image data of the top logo image R1 (below referred to as the top logo image data) contained in the acquired command. The third transmission data generator 41*c* also acquires the barcode print instructions command C5 stored in memory area A3, and acquires the code (=the receipt identification code) specified in the command.

As described above, after generating the receipt image data, the top logo image data, and the receipt identification code, the third transmission data generator 41*c* generates third transmission data D3 containing this information.

The fourth transmission data generator 41*d* is described next.

The fourth transmission data generator 41*d* is a function block that generates the fourth transmission data D4 sent to the customer behavior management server 18. The fourth transmission data generator 41*d* is described below in detail.

FIG. 5D illustrates the fourth transmission data D4 in a format suited to description. The fourth transmission data D4 is data written in XML or other markup language.

As shown in FIG. 5D, information denoting the date and time the receipt was issued, information identifying the product name, price, quantity, and line item total of each product, information denoting the transaction total, and information denoting the member number is contained in the fourth transmission data D4. The fourth transmission data generator 41*d* acquires this information by the method described above, and generates the fourth transmission data D4 based on the acquired information.

The data transmission unit 42 is described next.

The data transmission unit 42 controls the network communication unit 24 and sends the first transmission data D1 to the coupon management server 15, the second transmission data D2 to the sales management server 16, the third transmission data D3 to the electronic receipt management server 17, and the fourth transmission data D4 to the customer behavior management server 18.

How each server uses the received data is described below with reference to a specific example.

Operation of the coupon management server 15 and host computer 12 after the first transmission data D1 is sent to the coupon management server 15 is described further below.

The sales management server 16 is a server that manages sales in a store.

Information denoting the date and time the receipt was issued, information denoting the product name, price, quantity, and line item total for each purchased product, and information denoting the transaction total is contained in the second transmission data D2 (see FIG. 5B) sent to the sales management server 16.

The sales management server 16 cumulatively stores the received second transmission data D2. The sales management server 16 also provides a user interface that receives, for example, queries about the total sales during a specific period of time, queries about the total quantity of a particular product sold during a specific period of time, and queries about the average total sales during a specific period of time. When a query is received through the user interface, the sales management server 16 extracts the relevant second transmission data D2, calculates the answer to the query based on the content of the extracted second transmission data D2, and responds to the query.

For example, a query about the total sales during a specific period of time may be received. In this event, the sales management server 16 extracts the second transmission data D2 with a receipt date in the specified period from the cumulatively stored second transmission data D2. The sales management server 16 then calculates the cumulative total of all transaction totals in the extracted second transmission data D2, and responds to the query with the calculated total as the answer.

The electronic receipt management server 17 is a server that digitally manages receipts.

The electronic receipt management server 17 cumulatively stores the received third transmission data D3. The electronic receipt management server 17 provides a user interface for inputting the receipt identification code and reprinting a receipt, for example. When a receipt identification code is input and a command to reprint a receipt is asserted through the user interface, the electronic receipt management server 17 searches the cumulatively stored third transmission data D3 to find the third transmission data D3 containing the input identification code. Based on the receipt image data contained in the retrieved third transmission data D3, the electronic receipt management server 17 then reprints the receipt through a specific printer.

The electronic receipt management server 17 may also provide a user interface for inputting a receipt identification code and e-mail address, and instructing sending the receipt image data to the input e-mail address, for example. When a receipt identification code and e-mail address are input, and a command to send the receipt image data is issued through this user interface, the electronic receipt management server 17 finds the receipt image data corresponding to the receipt identification code, and controls a mailer to send the receipt image data in a specific format to the input e-mail address. Note that the third transmission data D3 also contains member number information, and the electronic receipt management server 17 could be configured to store an e-mail address related to each member number, and when third transmission data D3 is received, systematically send the receipt image data to the corresponding e-mail address.

In addition, because top logo image data is also contained in the third transmission data D3, the electronic receipt management server 17 could send only the top logo, or send the top logo image data, for a receipt of a specific identification code.

The customer behavior management server 18 is a server that manages customer behavior information.

The customer behavior management server 18 cumulatively stores the received fourth transmission data D4 for each member number (=each member), for example. Based on the fourth transmission data D4 for each member, the customer behavior management server 18 calculates the average transaction total for each member, and manages the products purchased by each customer, for example.

The customer behavior management server 18 can be configured to analyze purchasing behavior using specific data mining techniques or statistical methods based on the fourth transmission data D4 cumulatively stored for each member.

Operation of the coupon management server 15 and host computer 12 after first transmission data D1 is sent to the coupon management server 15 is described next.

The functional configuration of the coupon management server 15 is described first using FIG. 3. As shown in FIG. 3, the coupon management server 15 has a server control unit 50, a server storage unit 51, and an interface unit 52. The server control unit 50 has a CPU, and controls other parts of the coupon management server 15. The server storage unit 51 nonvolatilely stores data rewritably. A conditions database 51a as described below is stored in the server storage unit 51. The interface unit 52 communicates according to a specific communication protocol with an external device on the network N as controlled by the server control unit 50.

Figures 6A, 6B:
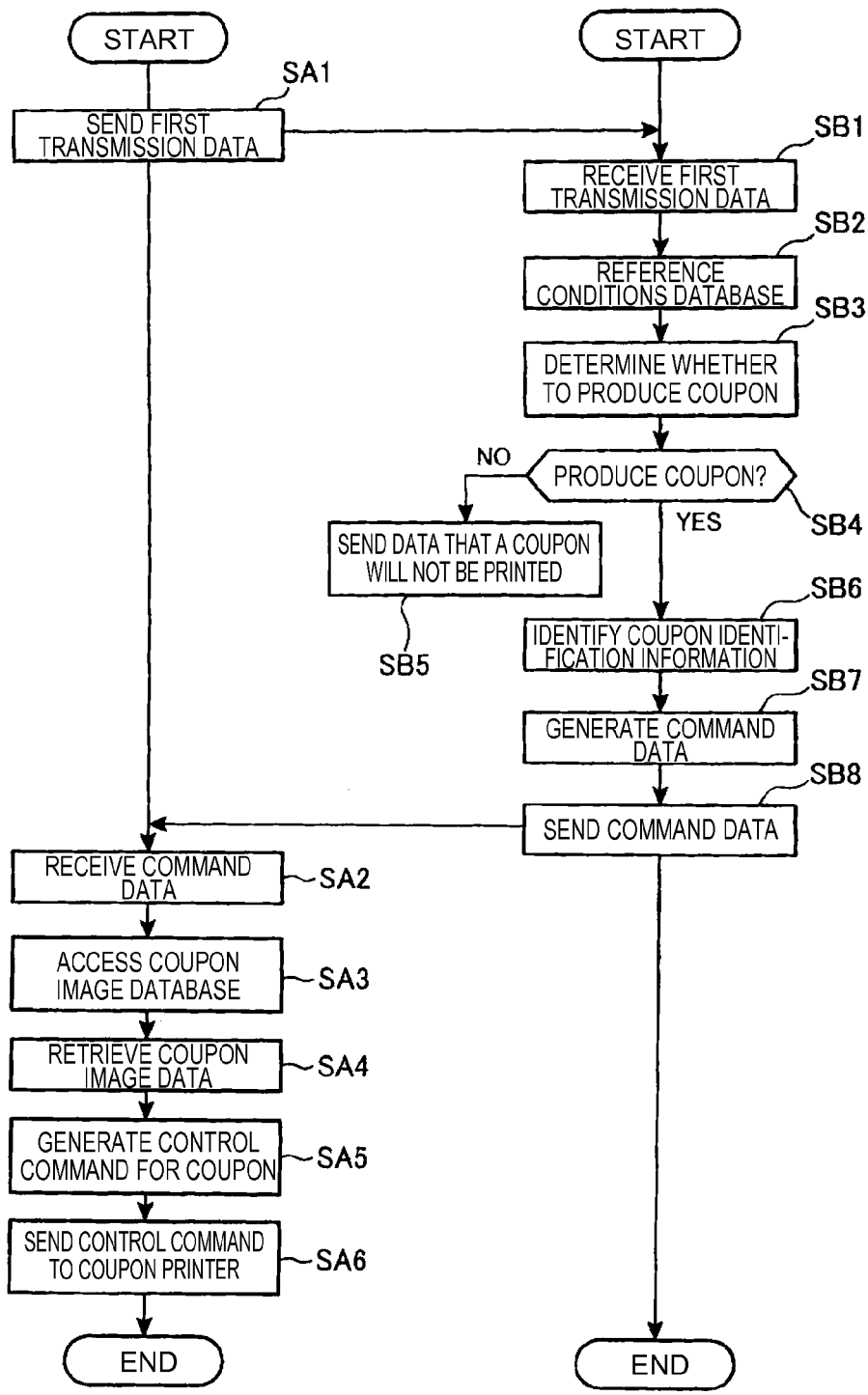
FIGS. 6A and 6B are flow charts showing the operation of the host computer and coupon management server.

FIGS. 6A-6C are flow charts showing the operation of the host computer 12 and coupon management server 15, FIG. 6A showing the operation of the coupon management server 15, and FIG. 6B showing the operation of the host computer 12.

As described above, the data transmission unit 42 of the host computer 12 sends the first transmission data D1 generated by the first transmission data generator 41a to the coupon management server 15 (step SA1).

When first transmission data D1 is received (step SB1), the server control unit 50 of the coupon management server 15 references the conditions database 51a (step SB2), and based on the first transmission data D1 determines whether or not a coupon should be issued (step SB3).

More specifically, a condition for producing a coupon and coupon identification information (described below) for the coupon to be produced when the condition is met are relationally stored in the conditions database 51a. Plural conditions may be stored.

Examples of these conditions are described below. Information indicating the name of a purchased product is contained in the first transmission data D1 as described above. As a result, one condition could be that a product of a specific name is purchased. Because the quantity purchased is also stored for each purchased product, another condition could be that at least a specific quantity of a product of a specific name is purchased.

Information denoting the transaction total is also contained in the first transmission data D1. Another condition could therefore be that the transaction total exceeds a predetermined specific amount.

Member number information is also contained in the first transmission data D1. Based thereon, another example of a condition is that the member number is a specific member number.

A configuration in which the condition changes dynamically based on the time or member is also conceivable. In other words, a condition could be any that is determined to be met or not based on information contained in the first transmission data D1.

In step SB3, the server control unit 50 determines if any condition managed in the conditions database 51a is met, determines to produce a coupon if even only one condition is met, and decides to not produce a coupon if no condition is satisfied.

If not producing a coupon is determined in step SB3 (step SB4 returns NO), the server control unit 50 sends data indicating to not produce a coupon to the host computer 12 (step SB5). When this data is received, the coupon production control unit 20c of the host computer 12 does not execute the process related to producing a coupon, and does not print a coupon.

However, if producing a coupon is determined in step SB3 (step SB4 returns YES), the server control unit 50 retrieves the coupon identification information stored relationally to the satisfied condition in the conditions database 51a (step SB6). If plural conditions are satisfied, coupon identification information related to the plural conditions is retrieved.

To further describe the coupon identification information, a coupon image database 23a is stored in the host storage unit 23 of the host computer 12 as described above. For each coupon that can be produced, the image data to be printed on the coupon (referred to below as the coupon image data), and coupon identification information, which is uniquely assigned identification information, are relationally stored in the coupon image database 23a. The coupon identification information is the identification information relationally stored with the coupon image data in the coupon image database 23a.

The server control unit 50 then generates command data containing the coupon identification information determined in step SB6 (step SB7), and sends the resulting command data to the host computer 12 (step SB8).

When this command data is received (step SA2), the coupon production control unit 20c of the host control unit 20 of the host computer 12 accesses the coupon image database 23a (step SA3).

The function of the coupon production control unit 20c is rendered by a program written using the API functions provided by OPOS or UPOS similarly to the command interpreting unit 20b. The coupon production control unit 20c program can be called as needed by a printer driver 36 conforming to the same OPOS or UPOS standard.

Next, the coupon production control unit 20c retrieves the coupon image data stored relationally to the coupon identification information contained in the command data from the coupon image database 23a (step SA4). If the command data contains coupon identification information for plural coupons, the coupon image data for the corresponding plural coupons is retrieved.

Next, the coupon production control unit 20c generates a control command causing the coupon printer 11 to print a coupon based on the retrieved coupon image data using a function of a previously installed printer driver for controlling the coupon printer 11 (step SA5). Next, after applying necessary data shaping of the generated control command using a function of the port communication service, for example, the coupon production control unit 20c in cooperation with coupon printer communication unit 26 sends the control command related to the coupon to the coupon printer 11 (step SA6). If there are plural coupons to be printed, control commands are generated and sent for each coupon to print.

Based on the received control command, the coupon printer 11 then prints the coupon.

As described above, the host computer 12 in this embodiment of the invention has a print control unit 20a that generates and outputs control commands for producing receipts to a receipt printer 10 (printing device). The host computer 12 also has a command interpreting unit 20b that interprets receipt control commands generated by the print control unit 20a, extracts specific information contained in the receipt control commands, and sends first transmission data D1 (transmission data) based on the extracted information to the coupon management server 15 (server device); and a coupon production control unit 20c that generates and outputs a control command for producing a coupon to a coupon printer 11 when command data instructing producing a coupon is received from the coupon management server 15 after transmission of the first transmission data D1.

In this configuration, the host computer 12 produces a coupon from the coupon printer 11 based on command data from the coupon management server 15 instead of the coupon management server 15 controlling the printer and causing the printer to produce a coupon. As a result, the coupon management server 15 will not simultaneously send coupon print commands to plural printers, for example, and concentrating the processing load on the coupon management server 15 is prevented. Furthermore, because the command data received from the coupon management server 15 is generated based on data extracted from the receipt control commands, coupons can be issued appropriately based on the content of the receipt.

This embodiment describes a configuration in which a coupon printer 11 dedicated to producing coupons is connected to the host computer 12, and coupons are produced by this printer. As a result, coupons can be produced by the coupon printer 11 without affecting the receipt printer 10 printing receipts. However, a configuration that produces coupons with the receipt printer 10 is also conceivable. In this configuration, only one printer needs to be connected to the host computer 12, and the cost can therefore be reduced.

In this embodiment, the host computer 12 also relationally stores coupon image data, which is the image data for the images to be printed on the coupons, and coupon identification information in a coupon image database 23a. When command data is received from the coupon management server 15, the coupon production control unit 20c generates and outputs a coupon control command based on the coupon image data related to the coupon identification information contained in the command data.

This configuration enables reducing the amount of command data sent from the coupon management server 15 to the host computer 12, suppresses an increase in communication traffic, and improves communication efficiency.

In this embodiment, the command interpreting unit 20b also extracts information related to the purchased products (product name, price, quantity, and line item total), and transaction information (transaction total) from the receipt control command, and sends first transmission data D1 based on the extracted information to the coupon management server 15.

With this configuration, the coupon management server 15 can generate command data appropriately to the purchased products or the transaction based on information related to the purchased products or information related to the transaction.

The host computer 12 in this embodiment sends both information related to the purchased products and information related to the transaction to the coupon management server 15, but could be configured to send only one of these.

The transaction-related information is also not limited to the transaction total, and could be any information that is printed on the receipt and related to the transaction.

The host computer 12 in the foregoing embodiment also has a command interpreting unit 20b that interprets the receipt control command generated by the print control unit 20a, extracts specific information contained in the control command for each of plural servers, generates transmission data based on the extracted information for each of the servers, and sends the data to the respective servers.

In this configuration information is extracted from the receipt control command for individual servers, and transmission data based on the information extracted for each server is transmitted, when a receipt is produced. As a result, each server can acquire needed information from the information printed on the receipt, and information printed on the receipt can be effectively used by means of functions of the individual servers.

A print string instruction command MC that specifies a string and instructs printing the specified string is also included in the receipt control command. When the content of the string specified by the print string instruction command MC matches specific content, the command interpreting unit 20b extracts the string, and generates and sends transmission data containing the extracted string to a specific server.

In one example, the command interpreting unit 20b extracts strings with content related to the receipt date, product name, price, quantity, line item total, and transaction total from the receipt control command, and sends second transmission data D2 containing the extracted string to the sales management server 16.

This configuration enables sending a string (information) of specific content to a specific server, and can send the information needed by a server.

This embodiment can also identify the content of a string based on the position of the string when the string is printed on the receipt recording medium based on the print string instruction command MC.

In one example, the command interpreting unit 20b identifies the content of the string starting at the first character in the string printed on one line based on the line item print instructions command C3 as the product name, identifies the content of the string starting at character T1 as the product price, and identifies the content of the string starting at character T2 as the quantity of the product on that line.

In this event, the receipt is characterized by the format of the printed image being known, and strings of specific content being printed at specific positions. This configuration can therefore use these characteristics to identify the content of strings printed on the receipt.

A string style command SC that specifies applying a specific style to the string instructed to be printed by the print string instruction command MC is also contained in the receipt control command in this embodiment. The command interpreting unit 20b can also determine the content of the string based on the style applied to the string specified for printing by the print string instruction command MC.

In one example, the command interpreting unit 20b identifies the string style command SC in the print date instructions command C2 based on knowing that the string style command SC in the print date instructions command C2 specifies applying a left-align style, and based thereon can determine that the content of the string is the print date.

In this event, the receipt is characterized by a specific style being regularly applied to a string containing specific content. This embodiment can therefore use this characteristic to determine the content of a string printed on a receipt.

The invention is described above with reference to a preferred embodiment thereof, but the invention is not limited thereto and can be modified and adapted in many ways without departing from the scope of the accompanying claims.

For example, the content of the receipt shown in FIG. 4A, the content of the control command shown in FIG. 4B, and the content of the transmission data shown in FIGS. 5A-5D are simply examples, and the invention is not limited to this content.

The function blocks shown in FIG. 2 and FIG. 3 are also achieved by the cooperation of hardware and software, and do not suggest a specific hardware configuration. For example, the functions described above can also be embodied by providing a program.

The functions of the printers, the host computer 12, and the servers can also be handled by other devices externally connected thereto.

The operations described above can also be executed by the printers and host computer 12 executing programs stored on externally connected storage media. These programs are more specifically run by the host control unit 20, receipt printer control unit 30, and coupon printer control unit 32. Exemplary storage media include hard disk drives, optical discs, magneto-optical discs, and flash memory devices.

What is claimed is:

1. A control device connecting to a printer that prints receipts and to a plurality of server devices, and comprising:
a processor configured to generate a control command causing the printer to produce a receipt and output the control command directly to the printer;
wherein the processor is further configured to interpret the generated receipt control command by grouping commands in the control command into commands related to printing commands related to printing graphic images, and commands related to printing a barcode and storing each group of commands separately in a memory;
wherein the processor is further configured to extract first specific information relating to product name, price, quantity, line item total for each purchased product, transaction total, and member number from the group of commands related to printing strings;
wherein the processor is further configured to extract second specific information relating to product name, price, quantity, line item total for each purchased product, and transaction total from the group of commands related to printing strings;
wherein the processor is further configured to extract third specific information relating to a logo and a receipt identification code from the group of commands related to printing graphic images and the group of commands related to printing a barcode;
wherein the process is further configured to extract fourth specific information relating to date and time of receipt issue, product name, price, quantity, line item total for each purchased product, transaction total, and member number from the group of commands related to printing strings;
wherein the processor is further configured to generate first transmission data from the first specific information and send the first transmission data to a coupon management server device;
wherein the processor is further configured to generate second transmission data from the second specific information and send the second transmission data to a sales management server device;
wherein the processor is further configured to generate third transmission data from the third specific information and send the third transmission data to an electronic receipt management server device;
wherein the processor is further configured to generate fourth transmission data from the fourth specific information and send the fourth transmission data to a customer behavior management server device; and wherein the different transmission data for each server device is written in markup language.

2. The control device described in claim 1, wherein:

the processor is further configured to identify the content of any of the commands related to printing strings based on a position of the string when the string is printed on a receipt recording medium based on the command.

3. The control device described in claim 1, wherein:

the processor is further configured to determine the content of any of the commands related to printing strings based on a style command that specifies applying a specific style to a string specified for printing.

4. The control device described in claim 1, wherein:

the processor is further configured to generate and output a control command to produce a coupon to the printer when command data instructing producing a coupon is received from one of the plurality of the server devices after transmission of transmission data to that server device.

5. The control device described in claim 4, wherein:

a coupon printer that produces coupons is connected; and the processor is further configured to generate and output a control command to produce a coupon to the coupon printer when the command data is received from one of the plurality of server devices.

6. The control device described in claim 4, wherein:

image data for an image that is printed on a coupon is relationally stored with identification information on the control device;

identification information related to the image data of the coupon to be produced is included in the command data received from one of the plurality of server devices; and when the command data is received, the processor is configured to generate and output a coupon control command based on the image data related to the identification information contained in the command data.

7. The device of claim 1, wherein the markup language is XML.

8. A control system comprising a control device connected to a printer that produces receipts, and a plurality of servers connected to the control device, wherein:

the control device has a processor configured to generate a control command causing the printer to produce a receipt and output the control command directly to the printer;

wherein the processor is further configured to interpret the generated receipt control command by grouping commands in the control command into commands related to printing commands related to printing graphic images, and commands related to printing a barcode and storing each group of commands separately in a memory;

wherein the processor is further configured to extract first specific information relating to product name, price, quantity, line item total for each purchased product, transaction total, and member number from the group of commands related to printing strings;

wherein the processor is further configured to extract second specific information relating to product name, price, quantity, line item total for each purchased product, and transaction total from the group of commands related to printing strings;

wherein the processor is further configured to extract third specific information relating to a logo and a receipt identification code from the group of commands related to printing graphic images and the group of commands related to printing a barcode;

wherein the process is further configured to extract fourth specific information relating to date and time of receipt issue, product name, price, quantity, line item total for each purchased product, transaction total, and member number from the group of commands related to printing strings;

wherein the processor is further configured to generate first transmission data from the first specific information and send the first transmission data to a coupon management server device;

wherein the processor is further configured to generate second transmission data from the second specific information and send the second transmission data to a sales management server device;

wherein the processor is further configured to generate third transmission data from the third specific information and send the third transmission data to an electronic receipt management server device;

wherein the processor is further configured to generate fourth transmission data from the fourth specific information and send the fourth transmission data to a customer behavior management server device; and wherein the different transmission data for each server device is written in markup language.

9. The control system described in claim 8, wherein:

one of the plurality of server devices determines whether or not to produce a coupon based on the received transmission data, and if a coupon is to be produced, generates and sends to the control device command data instructing producing a coupon; and the processor of the control device is further configured to generate and output a control command to produce a coupon to the printer when the command data is received from one of the plurality of server devices.

10. The system of claim 8, wherein the markup language is XML.

11. A control method of a control device connecting to a printer that prints receipts and to a plurality of server devices, comprising:

generating a control command causing the printer to produce a receipt and outputting the control command directly to the printer;

interpreting the generated receipt control command by grouping commands in the control command into commands related to printing strings, commands related to printing graphic images, and commands related to printing a barcode and storing each group of commands separately in a memory;

extracting first specific information relating to product name, price, quantity, line item total for each purchased product, transaction total, and member number from the group of commands related to printing strings;

extracting second specific information relating to product name, price, quantity, line item total for each purchased product, and transaction total from the group of commands related to printing strings;

extracting third specific information relating to a logo and a receipt identification code from the group of commands related to printing graphic images and the group of commands related to printing a barcode;

extracting fourth specific information relating to date and time of receipt issue, product name, price, quantity, line item total for each purchased product, transaction total, and member number from the group of commands related to printing strings;

generating first transmission data from the first specific information, writing the first transmission data in markup language, and sending the first transmission data to a coupon management server device;

generating second transmission data from the second specific information, writing the second transmission data in markup language, and sending the second transmission data to a sales management server device;

generating third transmission data from the third specific information, writing the third transmission data in markup language, and sending the third transmission data to an electronic receipt management server device;

generating fourth transmission data from the fourth specific information, writing the fourth transmission data in markup language, and sending the fourth transmission data to a customer behavior management server device.

12. The control method of a control device described in claim 11, further comprising:

generating and outputting a control command to produce a coupon to the printer when command data instructing producing a coupon is received from one of the plurality of server devices after sending transmission data.

13. The method of claim 11, wherein the markup language is XML.

* * * * *